United States Patent
Skilton et al.

(10) Patent No.: US 9,587,512 B1
(45) Date of Patent: Mar. 7, 2017

(54) METHOD FOR BALANCING A TURBOFAN ENGINE OR OTHER ROTATING SYSTEM

(75) Inventors: Timothy L. Skilton, Bellevue, WA (US); Kevin J. Pittenger, Redmond, WA (US)

(73) Assignee: The Boeing Company, Chicago, IL (US)

( * ) Notice: Subject to any disclaimer, the term of this patent is extended or adjusted under 35 U.S.C. 154(b) by 969 days.

(21) Appl. No.: 13/466,333

(22) Filed: May 8, 2012

(51) Int. Cl.
*F01D 21/04* (2006.01)

(52) U.S. Cl.
CPC ................... *F01D 21/045* (2013.01)

(58) Field of Classification Search
CPC ............ G01M 1/14; G01M 1/16; G01M 1/13;
G01M 1/18; G01M 1/20; G01M 1/22;
G01M 1/24; G01M 1/32; G01M 15/14;
F01D 21/045
See application file for complete search history.

(56) References Cited

U.S. PATENT DOCUMENTS

| | | | |
|---|---|---|---|
| 4,098,127 A * | 7/1978 | Shiga | F16F 15/32 73/462 |
| 4,485,678 A | 12/1984 | Fanuele | |
| 5,172,325 A | 12/1992 | Heidari | |
| 5,586,065 A | 12/1996 | Travis | |
| 6,505,143 B1 * | 1/2003 | Lakshminarasimha et al. | 702/183 |
| 7,243,023 B2 * | 7/2007 | Skilton | F01D 5/027 318/128 |
| 7,321,809 B2 | 1/2008 | Vian et al. | |
| 7,371,042 B2 | 5/2008 | Lee | |
| 2004/0060347 A1 * | 4/2004 | Comperat | F01D 21/045 73/66 |
| 2006/0251507 A1 * | 11/2006 | Braswell et al. | 415/13 |

* cited by examiner

*Primary Examiner* — Manuel Rivera Vargas
(74) *Attorney, Agent, or Firm* — Ostrager Chong Flaherty & Broitman P.C.

(57) ABSTRACT

A method for balancing rotating machinery, such as gas turbine engines, to minimize vibrations. The method involves operation of the engine for a period of time at varying power levels and ranges of other operational parameters representative of the system operating envelope to obtain vibration data (amplitude and phase) for the full range of dynamic responses of interest. This usually includes time at elevated power settings until the engine reaches thermal stability, altitude variation, etc. as well as the full engine operating range. The full set of vibration data measured during the engine run is analyzed to generate unique unbalance states. The unique unbalance states are then analyzed and the mean unbalance state is identified. Balancing masses can then be installed or removed in accordance with a balance solution that is equal and opposite to the mean unbalance state.

7 Claims, 6 Drawing Sheets

METHOD FOR BALANCING A TURBOFAN ENGINE OR OTHER ROTATING SYSTEM

BACKGROUND

This disclosure generally relates to systems and methods for balancing rotating machinery to reduce or minimize vibrations. In particular, the disclosed embodiments relate to systems and methods for balancing gas turbine engines.

It is either impossible or nearly impossible, as a practical matter, to build a rotating structure that is perfectly balanced upon manufacture. Any such structure will produce a certain amount of undesired vibration to a greater or lesser extent. Such vibration is usually passed through mounts that restrain the rotating part of the structure, and can therefore manifest itself as unwanted noise or vibration in adjacent structures. As is known to those skilled in the art, synchronous vibration may be characterized by an amplitude (i.e., magnitude) and a phase angle (i.e., direction). Thus, the vibration of a part may be represented as a vector or phasor.

One type of rotating machinery susceptible to undesired vibration is the high-bypass turbofan engine used in commercial aviation. Such engines have a large number of rotating elements. These rotating elements can be grouped according to the relative speed of rotation. Some of the rotating elements form a low-speed rotating system and other rotating elements form one or more high-speed rotating systems. More specifically, each rotating system of a gas turbine engine comprises an upstream rotating multi-stage compressor connected to a downstream multi-stage turbine by means of a shaft. The low-pressure turbine and low-pressure compressor are connected by a low-pressure shaft; the high-pressure turbine and high-pressure compressor are connected by a high-pressure shaft which surrounds a portion of the low-pressure shaft, with the high-pressure compressor and turbine being disposed between the low-pressure compressor and turbine. The fan of the turbofan engine is the first stage of the low-pressure compressor. Vibration caused by unbalances in the various stages of a turbofan engine contributes to wear and fatigue in engine components and surrounding structures, and unwanted noise in the passenger cabin of the airplane.

One way of reducing structurally transmitted vibrations is to balance the rotating systems of aircraft engines on a regular basis. Engine balancing is well known in the aircraft art. The manufacturers of turbofan engines have developed techniques for controlling the magnitude of unwanted vibration by affixing balancing mass to the engine. Typically, only the fan and the last stage of the low-pressure turbine of a turbofan engine are accessible for applying balancing mass after the engine is manufactured or assembled. Internal stages are inaccessible as a practical matter.

A known method for applying balancing mass involves the selection of a combination of balancing screws from a set of screws of different standard mass, with screws being threadably inserted into respective threaded holes located around an outer periphery of an internal turbofan engine component (such as a fan spinner). For example, to achieve a balance, one or more screws of the same mass or different masses can be screwed into respective threaded holes, thereby producing a center of gravity which is closer to the axis of rotation than was the case without balancing. The total effect of multiple attached balancing masses can be determined by treating each mass and its respective location as a vector, originating at the axis of rotation, and performing a vector sum.

Although the unbalances of accessible stages of a turbofan engine are the primary contributors to engine vibration, the unbalances that often reside at inaccessible engine stages also contribute to overall engine vibration. When corrective masses can only be placed on the two accessible stages, it is difficult to select masses of the proper magnitude and angular position such that they not only function to reduce vibration caused by specific unbalances at the fan and last stage of the low-pressure turbine, but also reduce the influence of unbalances at the remaining/other stages of the low-pressure compressor and turbine, as well as over the operating envelope of the engine.

The specification of the location and amount of mass to be applied to a rotating system in order to balance it is referred to herein as the balance solution for the rotating system. In order to determine balance solutions for rotating systems of turbofan engines, vibration data is obtained. Vibration data is a measure of the amount of vibration that an engine is producing at various locations as the engine is operated at various speeds and through ranges of other parameters. Vibration data can be gathered at an engine balancing facility located on the ground or during flight. If accelerometers are used to capture rotating system vibration response, synchronous vibration data may be derived using a keyphasor index on the rotating system. While multiple methods known to the art can be used to capture and derive vibration data, that data must contain a displacement as well as a phase corresponding to synchronous vibration. After vibration data is obtained, the vibration data is used to derive a balance solution that attempts to minimize the vibration of the engine producing the data.

In a known procedure for gathering engine vibration data in flight, so-called "stable" vibration data is captured using the last stable point for each of six speed ranges. Sufficient stability is established by monitoring amplitude over a period of time and verifying that the amplitude variation is within an acceptable predefined limit. (Stability can also be determined from phase and N1 speed remaining within a given range for a given time.) The corresponding shaft speed is also captured by recording outputs from a tachometer or other shaft speed sensor. A respective "stable" vibration data point is captured during the flight (vibration amplitude and phase) for each range of shaft speed. If stability is achieved, the new vibration data point is substituted for the present "stable" vibration data point in the corresponding shaft speed range. After the aircraft has landed, the "stable" vibration data points (vibration amplitude and phase) recorded during the flight for the six shaft speed ranges are extracted and then a least squares amplitude solution is calculated using the six speed range points and general in-flight influence coefficients. (The method of least squares is a standard approach to the approximate solution of overdetermined systems, i.e., sets of equations in which there are more equations than unknowns. "Least squares" means that the overall solution minimizes the sum of the squares of the errors made in the results of every single equation.) The output of this analysis process is adopted as the proposed balance solution. This method intrinsically assumes that there is a unique relationship between engine speed and vibration response; for example, a particular engine speed always produces a similar vibration response.

Dynamic unbalance characteristics cause sub-optimal balance solutions using state-of-the-art balancing techniques. Existing techniques do not account for dynamic characteristics related to parameters other than shaft speed, resulting in solutions that require multiple attempts to obtain acceptable balance states. There is a need for improved methods of balancing turbofan engines having dynamic unbalance characteristics to minimize vibrations.

SUMMARY

The subject matter of this disclosure is a method for balancing rotating machinery (such as turbofan engines) having dynamic unbalance characteristics to minimize vibrations. The method involves operation of the rotating machinery through a representative range of operating conditions that the balance solution is to be effective over. In the case of an aircraft turbofan engine, this typically includes flying the aircraft on which the engine of interest is installed. The representative range of operating conditions may include operation for extended periods of time over a broad range of shaft speeds, power settings, and ambient conditions. An example of a set of aircraft flight regimes that may be suitable for satisfying the representative range of operating conditions may include aircraft taxi, engine run-up, take-off climb, level-out, cruise, descent, idle descent and landing. As the engine of interest is operated through the representative operational envelope, vibration sensor output is sampled and correlated with a keyphasor signal to produce vibration data. The vibration data may be expressed as an amplitude having units of displacement and a phase having angular units. Influence coefficients may be applied to the vibration data for the purpose of determining an unbalance state. An unbalance state consists of an unbalance magnitude having units of mass-length and an unbalance angle. Unique unbalance states are identified using predefined criteria. For illustrative purposes, an unbalance state could be considered unique if when plotted as a point on a polar plot, no other unbalance state exists within a predefined boundary. If a second unbalance state is plotted and falls within the predefined boundary, it would be considered a non-unique unbalance state and discarded. The unique unbalance states may then be used to determine a single mean unbalance state. The engine is then balanced by adding one or more balancing masses summing to a mass-length equivalent of the mean unbalance state at a phase angle 180 degrees from the angle associated with the mean unbalance state. The method improves the balance of the rotating machinery since the balance solution is based on a plurality of unique data points for each speed or speed range of interest and engine vibration responses throughout the representative range of operating conditions.

In accordance with one embodiment, a method for balancing a rotating system is provided comprising: (a) attaching a vibration sensor to a structure that vibrates during operation of the rotating system; (b) operating the rotating system for a period of time within an operating envelope; (c) converting output from the vibration sensor into vibration data points during operation, said vibration data points comprising amplitude and phase data; (d) calculating respective unbalance states from said vibration data points; (e) identifying unbalance states calculated in step (d) which differ from each other by at least a threshold range; (f) calculating a mean unbalance state using unbalance states identified in step (e); and (g) attaching and/or removing one or more balancing masses to the rotating system to achieve a state which at least partly compensates for an unbalance represented by said mean unbalance state.

The foregoing method can be used to balance a gas turbine engine on an aircraft, in which case the operating envelope may comprise varying operating conditions which influence engine vibration response, such as power setting, flight regime, altitude and temperature. The method for balancing a turbine engine may further comprise: pre-storing a set of influence coefficients that are characteristic of a model of the engine being balanced; and deriving influence coefficients from that set of influence coefficients, in which case the unbalance states are a vector product based on the respective vibration data points and the derived influence coefficients. The derived influence coefficients in this example may relate at least in part to a shaft speed of the engine at the time when the respective vibration data point was acquired.

In accordance with another embodiment, a method for locating an end of a mean unbalance state vector to be applied to a rotating system is provided, which method comprises: (a) attaching a vibration sensor to a structure that vibrates during operation of the rotating system; (b) operating the rotating system for a period of time within an operating envelope; (c) converting output from the vibration sensor into vibration data points during operation, the vibration data points comprising amplitude and phase data; (d) calculating first and second coordinates of unbalance states for respective vibration data points; (e) identifying unbalance states which differ from each other by more than a preset threshold; (f) calculating a mean value of the first coordinates of the unbalance states identified in step (e); (g) calculating a mean value of the second coordinates of the unbalance states identified in step (e); and (h) locating an end of a mean unbalance state vector using the mean values of said first and second coordinates. This method may further comprise: (i) plotting unbalance states identified in step (e) in accordance with their respective first and second coordinates; and (j) displaying a graphical symbol on the plot made in step (i), a portion of the graphical symbol being located at the location of the end of the mean unbalance state vector.

In accordance with a further aspect, a vibration analyzer is provided for analyzing vibration data points representing amplitude and phase of vibrations produced by a rotating system having a shaft. In one implementation, the analyzer comprises a computer system programmed to perform the following operations: (a) calculating respective unbalance states for the vibration data points; (b) identifying unbalance states calculated in step (a) which differ from each other by greater than a preset threshold; and (c) calculating a mean unbalance state using unbalance states identified in operation (b). The analyzer may further comprise memory storing a set of influence coefficients that are characteristic of a model of the engine, wherein the computer system is further programmed to derive influence coefficients from that set of influence coefficients.

In accordance with another aspect, a system is provided onboard an aircraft for processing data from one or more vibration sensors that detect vibrations produced by a turbine engine during flight. In one implementation, this system comprises a computer system programmed to perform the following operations: (a) converting output from the vibration sensor into vibration data points during operation, the vibration data points comprising amplitude and phase data; (b) calculating respective unbalance states for the vibration data points; (c) identifying unbalance states calculated in step (b) which differ from each other by greater than a preset threshold; and (d) calculating a mean unbalance state using unbalance states identified in step (c).

Other aspects of the balancing method are disclosed and claimed below.

BRIEF DESCRIPTION OF THE DRAWINGS

Various embodiments will be hereinafter described with reference to the drawings.

Reference will hereinafter be made to the drawings in which similar elements in different drawings bear the same reference numerals.

DETAILED DESCRIPTION

Various embodiments of methods for balancing gas turbine engines having dynamic unbalance characteristics will be described in this section. A person skilled in the art will appreciate that various steps of the below-disclosed methods also have application in procedures for balancing other types of rotating machinery (such as steam turbines, power trains, gas compressors, etc.).

Figure 1:
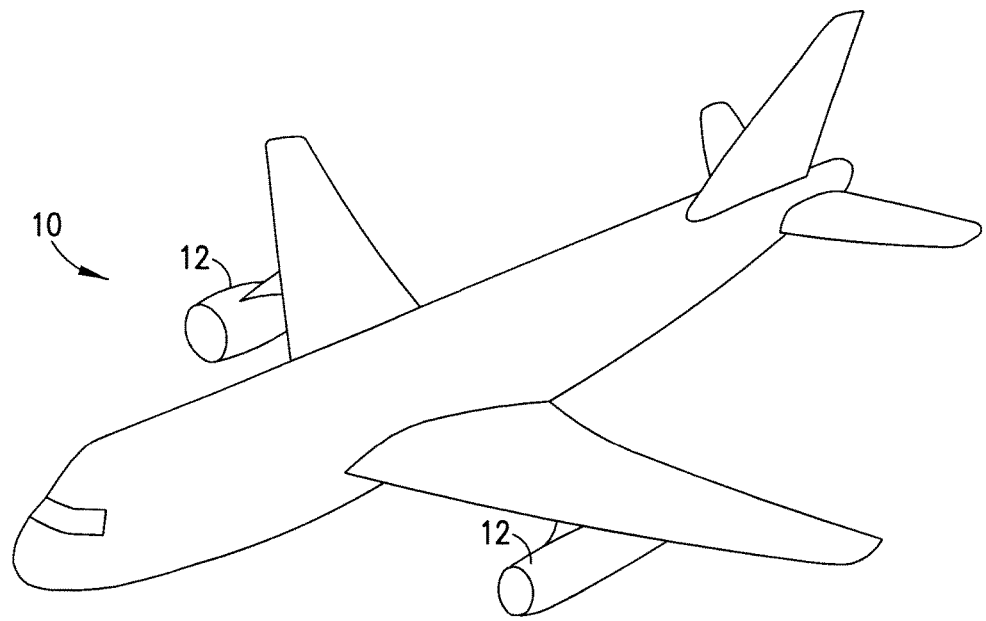
FIG. 1 is a diagram showing an isometric view of one example of an aircraft having gas turbine engines.
Figure 2:
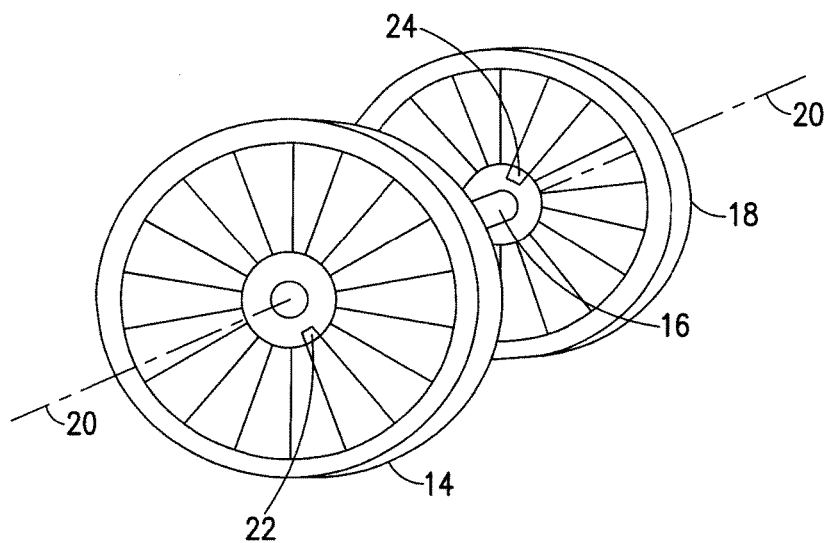
FIG. 2 is a diagram showing an isometric view of idealized rotating components of a turbojet engine.

FIG. 1 shows an aircraft 10 having a pair of gas turbine engines 12. Although the engines may be turbojet engines or turbofan engines, FIG. 2 is an idealized depiction of some rotating components of a turbojet engine. In particular, FIG. 2 shows a compressor disk 14, a shaft 16, and a turbine disk 18, both disks being mounted on the shaft 16. This is just one example of a type of rotating machinery which can be balanced using the methodology disclosed hereinafter.

Due to many factors, such as manufacturing and assembly tolerances, distortion over time, and/or wear, it is unlikely that the center of mass of the compressor disk 14 and/or turbine disk 18 will perfectly match a geometric axis of rotation 20 of the assembly. Therefore, an attachment point 22 may be included on compressor disk 14 and/or an attachment point 24 may be included on turbine disk 18. Balancing masses may be added at the attachment points to balance the assembly about its axis of rotation 20. A balancing mass is intended to alter the center of mass of the rotating assembly to better align or coincide with the axis of rotation 20, thereby reducing if not minimizing vibrations.

Figure 3:
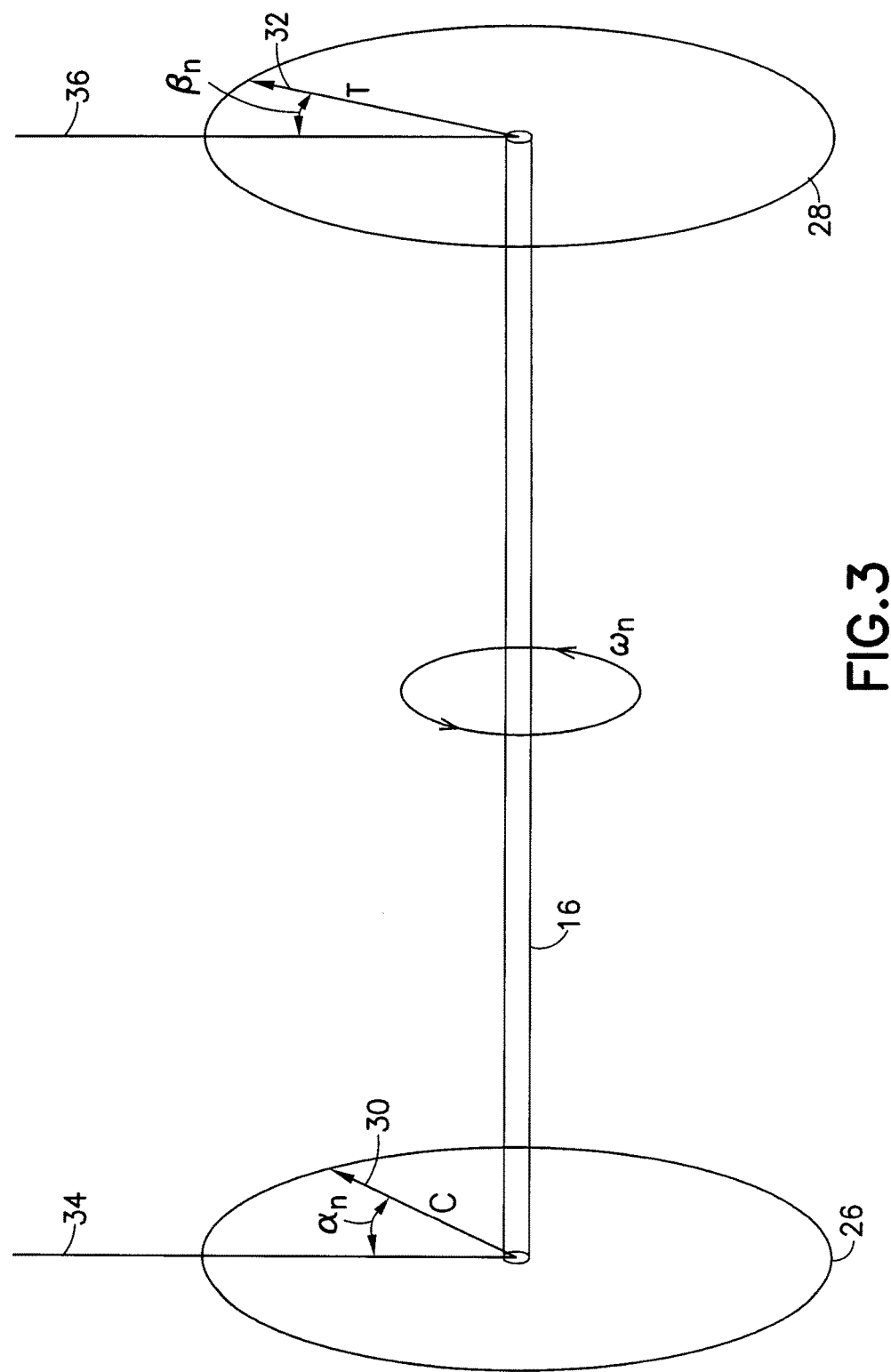
FIG. 3 is a vector diagram representing vibrations generated during rotation of the rotating components depicted in idealized form in FIG. 2.

FIG. 3 is a vector diagram depicting the forces exerted on a gas turbine engine due to vibrations of the compressor and turbine disks. The shaft 16 is shown rotating at a speed $\omega_n$ between a forward unbalance plane 26 and an aft unbalance plane 28. The aft unbalance plane 28 corresponds to the location where a turbine disk is located (toward the aft end of the engine) and where the vibration induced by the turbine disk acts on the engine. For a particular instant in time, an unbalanced condition T of the turbine disk is depicted as a vector 32. Likewise, the forward unbalance plane 26 corresponds to the location where a compressor disk (or a fan) is located (toward the forward end of the engine) and where the vibration induced by the compressor disk (or fan) acts on the engine. For the same particular instant in time, an unbalanced condition C of the compressor disk is depicted as a vector 30.

The vector 30 has a magnitude and a phase angle $\alpha_n$ at the rotational speed $\omega_n$. Similarly, the unbalanced displacement vector 32 has a magnitude and a phase angle $\beta_n$ at the rotational speed $\omega_n$. The magnitudes and phase angles of vectors 30 and 32 can be determined using any suitable technique known in the art, for example, an influence coefficient method of balancing can be employed. The use of influence coefficients to balance aircraft engines is well known.

In the case of a high-bypass turbofan engine, a known balancing method takes into account the effects of plane unbalances at the fan and the last stage of the low-pressure turbine, and other plane unbalances caused by stages that lack means for mounting balancing weights. The as-built vibration at any location in an engine is at least in part due to such unbalances, although some stages typically affect the overall unbalance more than others. The influences of unbalances in all of the stages of the rotating system can be related to the accessible stages using influence coefficients, which can be derived from the vibrational responses when different balancing mass are installed and the system is operated. These vibrational responses are measured at various shaft speeds using sensor pickups (e.g., accelerometers). In practice, any engine that has unacceptably high unbalances after manufacture can be first run on the ground to measure its as-built vibration via sensor pickups. These measurements can be taken over the engine operating range of speeds (measured in rpms). Such data may be recorded when the engine is operating at a specific shaft speed. Measurements while the engine is on the ground do not take into account certain kinds of dynamic response now identified in aircraft engines. Such dynamic responses may be obtained from vibration data collected during a variety of conditions. In the case of aircraft engines, the majority of their service life will be spent in the air, rendering data taken only from test cell or ground conditions of limited value for achieving adequate balancing.

Influence coefficients determined for a particular location are representative of a response at a balancing plane or plane of interest. Influence coefficients may be expressed as a magnitude and a phase shift having units of mass-length per displacement and angle respectively. One set of magnitude units typically used is gram-centimeters per mil. One known method of calculating influence coefficients for such planes or stages is to use measured data from a representative baseline engine ground run, and two trial runs, where data from each trial run is obtained from sensor pickups after placing trial masses on one or both balancing planes (e.g., fan and last stage of the low-pressure turbine). Trials may be conducted for the engine operating envelope. Thus, the influence coefficients can be calculated since the actual corrective masses added during any trial run are known, and the resultant change in vibration is also known because it can be measured at the sensor pickups.

In theory, the influence coefficients for a given engine, or from one engine to another of the same type or model, should be nearly identical. However, due to nonlinearity factors, manufacturing tolerances, measurement errors, wear, distortion over time, and other factors, it has been found that a single set of influence coefficients cannot be relied on. It is known in the prior art to implement a balancing method by a simple averaging of influence coefficients calculated for a number of engines, to obtain so-called generic influence coefficients usable for most engines with some level of confidence, or more exact influence coefficients can be calculated for each engine in the above-described manner. In accordance with a known balancing procedure, a history of an engine's characteristics, including predetermined influence coefficients for trim balancing, can be updated and stored for reference when performing the balancing procedure. These influence coefficients relate vibration data amplitude and phase at specific locations and shaft speeds to the mass unbalance at a reference position.

As previously noted, in order to determine balance solutions for the rotating systems of aircraft engines, vibration data is obtained. In the balancing methods disclosed herein, vibration data is gathered during flight and, optionally, from non-flight conditions. In one embodiment of an improved balancing method, the engine is operated for a period of time under different flight regimes such as take-off, climb, level-off, cruise, descent, idle descent, etc. Operation in the different flight regimes exposes the engine to different power settings, altitudes, ambient temperatures, and so forth. Such varying operating parameters influence the engine vibration characteristics, resulting in variation which can be measured for the full range of dynamic responses of interest by acquiring vibration data. The operational envelope of an engine may include time at elevated power settings, thermal loading, altitude variation, changes to rotational inertia as well as the full engine operating range for different flight regimes. For example, vibration data may be acquired for each engine throughout an entire flight of the aircraft, including takeoff, climb, cruise, descent and landing. The improved method subjects the engine to different operating conditions. For a particular speed of interest, there is typically a different vibration or accelerometer response associated with each operating condition. Multiple responses or data points are acquired for each speed or speed range of interest. The multitude of responses is more representative of in-service use or subsequent flights. The multitude of responses can be used advantageously to determine and apply a balance solution. The applied balance solution may have advantages over balance solutions that are based on single response, from a single operating condition, for each speed or speed range of interest.

Figure 4:
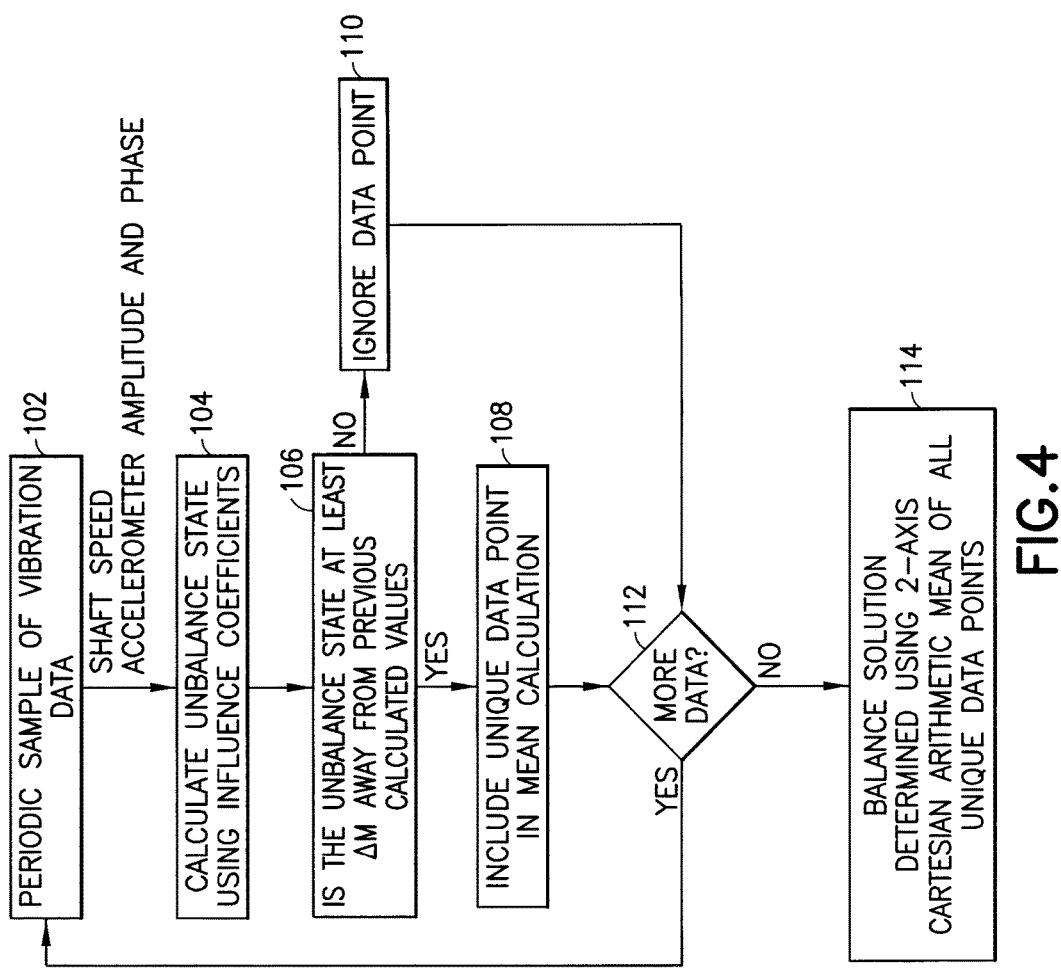
FIG. 4 is a flowchart showing steps of a process for analyzing collected vibration data in accordance with one embodiment.

Various steps of an improved balancing method are shown in FIG. 4. During flight, samples of vibration data are acquired from each vibration sensor (i.e., accelerometer)(see step 102). A data recorder, such as a digital flight data recorder (DFDR) or an airborne vibration monitor (AVM) box, receives vibration data samples (amplitude and phase) from each vibration sensor in the sensor set along with shaft speed data from a tachometer. The sensor outputs can take the form of variable voltage or other signals, which can be converted to amplitude and phase by the AVM box (or flight data recorder).

After vibration data has been collected for the operational envelope of the engines, the data inside the AVM box or DFDR can be processed by a vibration data analyzer located onboard the aircraft (optionally, nearly in real-time) or on the ground. The vibration data analyzer comprises a processor that is programmed to select data corresponding to so-called unique vibration data points for each vibration sensor for each accessible plane of imbalance of an engine to be balanced. The analytical process depicted in FIG. 4 is for a plane of unbalance of an engine to be balanced. This process involves calculating respective unbalance states for vibration data samples 102 acquired by any sensor within a range of the plane of unbalance of interest and then extracting the calculation results corresponding to "unique" unbalance states, i.e., those unbalance states which are more than a specified distance from previously derived unbalance states. This process can be duplicated for each accessible plane of unbalance of the engine to be balanced.

Still referring to FIG. 4, the first step 104 in the analytical process is to calculate a respective unbalance state for each vibration data sample 102 output by a particular vibration sensor, using selected general influence coefficients for the particular model of aircraft engine to be balanced. In the present context, which particular influence coefficients are selected for use will, among other factors, be a function of the engine shaft speed and which plane of unbalance needs to be balanced. For example, for a particular engine model, respective influence coefficients can be provided corresponding to respective shaft speed ranges. For each vibration data point 102 acquired while the engine shaft speed was in a particular speed range, the respective influence coefficients will be those associated with that particular speed range or an interpolation of such influence coefficients. Influence coefficients may be expressed in vector form. An unbalance state may be determined based on a vector product of a vibration data point and a respective influence coefficient. The unbalance state can also be represented by a vector, symbolized as M in FIG. 5, the tip location of which can be plotted in polar coordinates. The Cartesian coordinates for the tip location of the unbalance state vector M may then be determined based on the number of units of the unbalance state from a vertical axis (Mx) and the number of units from a horizontal axis (My).

Referring back to FIG. 4, for each unbalance state calculated in step 104, a determination can be made whether or not the unbalance state is at least a threshold amount away from other unbalance states (step 106). The threshold amount may be referred to as a delta mass-length and symbolized as $\Delta M$. The threshold amount may also be viewed as a threshold boundary of radius $\Delta M$ (see circles in FIG. 5) about a given unbalance state (indicated by "+" symbols in FIG. 5). Other threshold criteria may be utilized to achieve other shapes for the threshold boundary, such as squares, rectangles, etc. If an unbalance state is not at least $\Delta M$ away from other unbalance states, then the unbalance state is treated as redundant and may be ignored or discarded (step 110). If the unbalance state is at least $\Delta M$ away from other unbalance states, corresponding to previously determined unique vibration data points, then the new vibration data point for which the latest unbalance state was derived will be treated as a unique vibration data point (step 108), meaning that its unbalance state will be included in the subsequent calculation (in step 114) of a two-axis Cartesian arithmetic mean unbalance state. After a determination is made whether or not the vibration data point being currently processed will be included or ignored, a determination is made (step 112) whether the data set includes unprocessed vibration data points. If additional data points need to be processed, the process returns to step 102; if not, then the mean unbalance state for the set of unique unbalance states is calculated (step 114).

Figure 5:
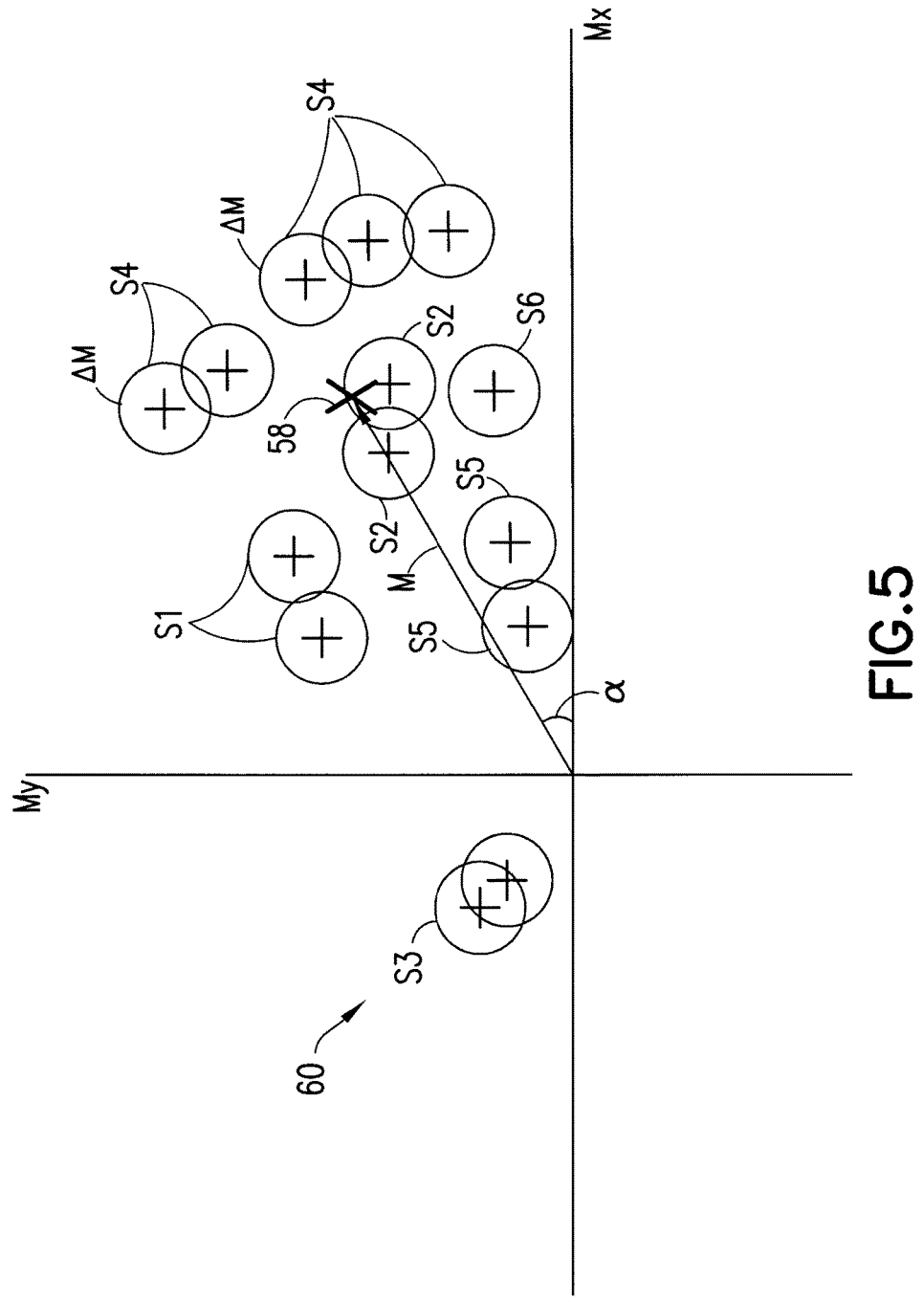
FIG. 5 is a plot showing unbalance states for a plurality of unique vibration data points recorded during flight and also showing a mean unbalance state (represented by X) derived from the plotted unique unbalance states.

FIG. 5 is a plot showing unbalance states for a plurality of vibration data points for a plurality of shaft speed ranges. In this example, the plotted unbalance states correspond to vibration data points acquired at shaft speeds having magnitudes within one of six shaft speed ranges S1 through S6. Each unbalance state is represented in FIG. 5 by a respective encircled "+" symbol. Any other suitable graphical symbol could be used. In FIG. 5, each unbalance state symbol, in turn, is labeled to indicate which shaft speed range includes the engine shaft speed at the time when the corresponding unique vibration data point was acquired. For example, FIG. 5 shows two unbalance states whose corresponding unique vibration data points were acquired when the shaft speed was in range S1, five unbalance states whose corresponding unique vibration data points were acquired when the shaft speed was in range S4, and so forth. The intent of FIG. 5 is to depict a plurality of unique unbalance states in the upper right-hand quadrant and a pair 60 of unbalance states which are not unique with respect to each other in the upper left-hand quadrant. Because each of the unbalance states of pair 60 lie within the threshold range $\Delta M$ of the other, the data point which is derived second will be discarded while the first data point is retained and treated as a unique unbalance state.

As shown in the plot of FIG. 5, each unbalance state can be specified by respective Mx and My coordinates, or a radius and angle corresponding to the vector representation for the respective unbalance state. The mean unbalance state vector M can then be determined by computing the arithmetic mean of the Mx coordinates and independently computing the arithmetic mean of the My coordinates, the resulting mean Mx and mean My coordinates specifying the mean unbalance state 58, indicated by an X.

The length of the mean unbalance state vector M from the origin to the mean unbalance state 58 corresponds to the magnitude (i.e., mass times displacement) of the balancing needed, while the angle $\alpha$ of vector M relative to the Mx axis represents the phase angle of the mean unbalance state vector. As previously noted, the balance solution can be achieved in different ways, for example, by attaching a mass m displaced by a distance D along a vector having a phase angle ($\alpha-180°$) or by attaching a mass 2m displaced by a distance D/2 along a vector having a phase angle ($\alpha-180°$) and so forth. In accordance with one embodiment, the circumferential locations of the balancing masses are equidistant from a centerline of the engine shaft. If the balancing mass attachment points are disposed along a circle of radius R, then the balancing mass for this example (assuming that one of the attachments is at angle ($\alpha-180°$) would be nm, where n=D/R. Alternatively, the same could be accomplished by combining the effects of two or more balancing masses attached at respective angles.

Figure 6:
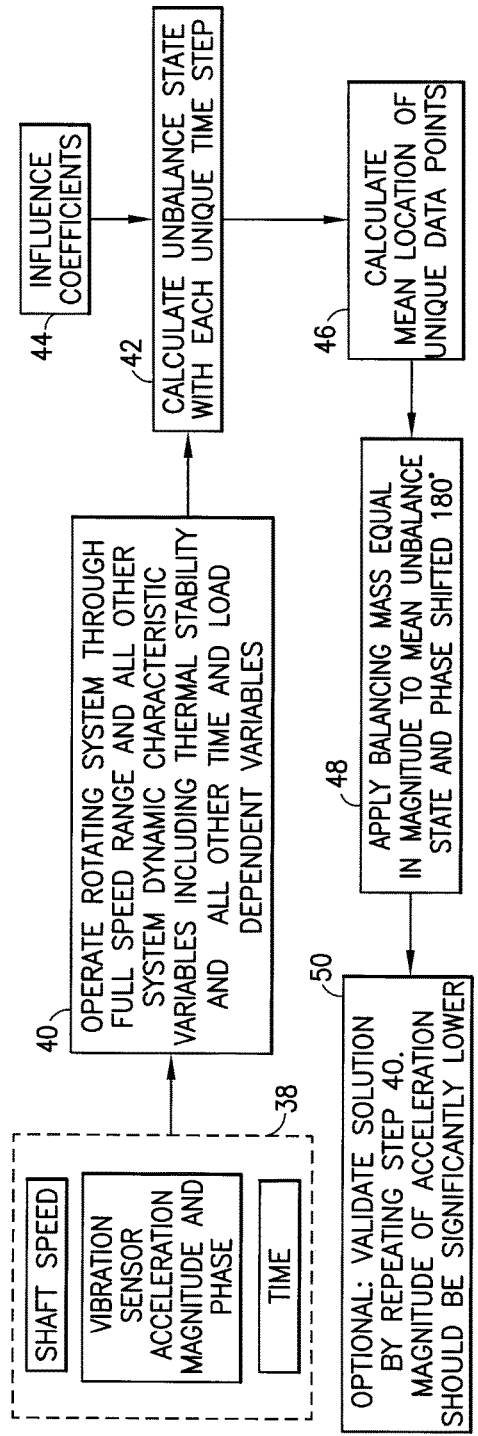
FIG. 6 is a flowchart showing steps of a process for balancing rotating machinery, such as gas turbine engines, having transient dynamic unbalance characteristics to minimize vibrations.

FIG. 6 shows additional details of the balancing method described above, which method is not limited to use in balancing aircraft engines, but rather has application in balancing other types of rotating systems. The method uses various input parameters 38, including shaft speed data from a tachometer (or other shaft speed sensor), vibration data from accelerometers, and time data for correlating vibration data and shaft speed data. The phase of a vibration can be determined, for example, by comparing the peak amplitude of the vibration to the pulses output by the shaft speed sensor (which may output one pulse per revolution). The balancing process shown in FIG. 6 can then be performed for each plane of imbalance that is accessible. One or more accelerometers can be used to acquire vibration data for each plane of imbalance.

Block 40 in FIG. 6 represents the physical step of operating the rotating system through a full shaft speed range and other system dynamic characteristics variables, including thermal stability and other time- and load-dependent variable ranges comprising the operating envelope. After vibration data has been acquired, the unbalance state is calculated (step 42) using pre-stored influence coefficients 44 that are characteristic of the model or type being balanced. Only sufficiently large changes in unbalance state are treated as being unique to ensure that time dwells under similar variable conditions do not adversely influence the mean unbalance state calculation. The mean unbalance state is then determined (step 46) by calculating a two-axis Cartesian arithmetic mean (as previously described with reference to FIG. 5). The analytical steps (i.e., steps 42 and 46 seen in FIG. 6) can be performed on the ground after the aircraft has landed or onboard the aircraft during the flight.

Figure 7:
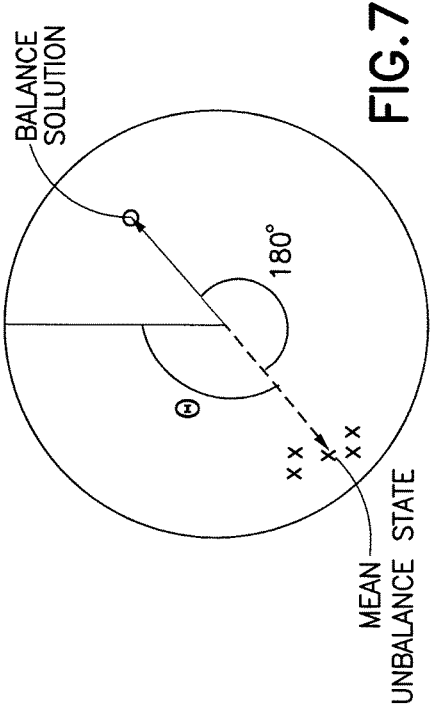
FIG. 7 is a diagram showing unbalance states for a plurality of unique vibration data points recorded during flight, a mean unbalance state derived from the plotted unique unbalance states, and an equal and opposite balance solution to counter the mean unbalance state.

After the mean unbalance state has been calculated, the vibration data processor outputs a proposed balance solution that has the same magnitude as the mean unbalance state but is shifted 180 degrees in phase to counteract imbalance points recorded during flight, accounting for the relationships of shaft speed (i.e., N1) and additional operational parameters to vibration. Then based on this balance solution, the physical step 48 of attaching one or more balancing masses at respective attachment points on the rotating component is performed. In one example depicted in FIG. 7, the resultant balancing solution is equal in magnitude to the mean of the unique unbalance states and phase shifted 180 degrees. Optionally, the balance solution can be validated by flying the airplanes with balanced engines (step 50 in FIG. 6). The magnitude of the accelerations during re-flight may be significantly lower.

In accordance with an alternative embodiment, a system for processing data from one or more vibration sensors that detect vibrations produced by an engine during flight is provided onboard the aircraft. This system comprises a computer system, programmed to perform of the operations depicted in FIG. 4. This system may take the form of an AVM box or DFDR that incorporates a vibration data analyzer. This would enable the vibration data analysis to be performed onboard the aircraft during flight.

Figure 8:
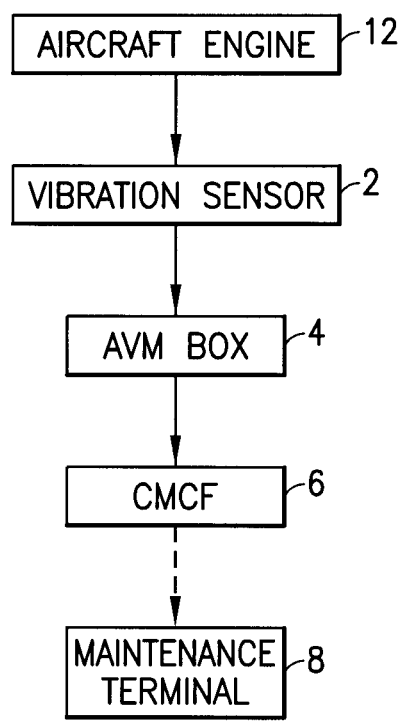
FIG. 8 is a block diagram showing components of a system for monitoring and analyzing engine vibrations during flight and then downloading the balance solution to maintenance personnel in accordance with a further embodiment.

FIG. 8 shows components of one embodiment of a system for monitoring and analyzing engine vibrations during flight and then downloading the balance solution to maintenance personnel. For the sake of illustration, the monitoring and analysis of vibrations produced by a turbofan engine 12 on an aircraft will be described. At least one vibration sensor 2 is attached to a non-rotating structure of the engine to detect vibrations produced by rotating engine components. An AVM box 4, incorporating a computer system programmed to perform the steps depicted in FIG. 4, receives the output from vibration sensor 2 during the flight.

It is known to provide an aircraft with a central maintenance computer function (CMCF). The CMCF encompasses major avionics, electrical, and mechanical systems installed on the aircraft. The CMCF collects, stores, and displays maintenance information generated by line commandable units. The CMCF also provides a centralized location to initiate system tests. The CMCF has operator interface display and input devices (i.e. multi-purpose control display units (MCDU)). In the embodiment depicted in FIG. 8, the output of the AVM box 4 is stored in a location accessible to a CMCF 6.

The prior art provides airline mechanics with an electronic maintenance terminal display that displays real-time CMCF data screens via MCDU emulation. A maintenance terminal 8 is typically a laptop PC comprising a cursor control device, a keyboard, an internal hard drive, a floppy diskette drive, a CD-ROM drive, and a graphical output printer bus. Using such a maintenance terminal, authorized personnel are able to access maintenance applications that supervise the aircraft's health status. The onboard network of the airplane is accessible from maintenance terminal 8 via either a wireline or wireless communication pathway. In the embodiment shown in FIG. 8, the output of the AVM box 4 can be retrieved by the CMCF 6 and downloaded to the maintenance terminal 8, where it can be viewed on a display screen.

The balancing method disclosed herein can be used to determine where and how many balancing masses should be added to an engine or can be used to determine how existing balancing masses are to be adjusted, for example, by adding mass, by moving one or more attached masses to different locations, or by removing one or more attached masses and substituting one or more different masses at the same or different locations.

The above-described balancing methodology may reduce if not minimize engine vibrations. In the case of an airplane, this reduction in engine vibration results in decreased transmitted cabin noise and vibration levels along with decreased (cyclical) stress in the support structures. Thus, this balancing method provides an aircraft which operates more quietly and which is subject to less fatigue. Therefore, sound insulation and structural weight may be reduced. The disclosed balancing method also eliminates the cost associated with re-working aircraft engines and verification re-flights.

While various embodiments have been described, it will be understood by those skilled in the art that various changes may be made and equivalents may be substituted for elements thereof without departing from the scope of the teachings herein. In addition, many modifications may be made to adapt a particular situation to those teachings without departing from the scope thereof. Therefore it is intended that scope of the claims set forth hereinafter not be limited to the disclosed embodiments.

As used in the claims, the term "computer system" should be construed broadly to encompass a system having at least one computer or processor, and which may have two or more interconnected computers or processors.

Furthermore, the method claims set forth hereinafter should not be construed to require that the steps recited therein be performed in alphabetical order or in the order in which they are recited.

The invention claimed is:

1. A method for balancing an unbalanced gas turbine engine of an airplane, comprising:
   (a) attaching a vibration sensor to an unbalanced gas turbine engine of an airplane;
   (b) acquiring vibration sensor data from the vibration sensor during a flight of the airplane;
   (c) converting the vibration sensor data output from the vibration sensor into vibration data points, said vibration data points comprising amplitude and phase data;
   (d) calculating respective unbalance states for said vibration data points;
   (e) identifying unbalance states calculated in step (d) which differ from each other by at least a threshold amount;
   (f) calculating a mean unbalance state having a magnitude and an angle using unbalance states identified in step (e); and
   (g) balancing the unbalanced gas turbine engine by attaching or removing at least one balancing mass summing to a mass-length equivalent of said mean unbalance state at a phase angle 180 degrees from the angle associated with said mean unbalance state.

2. The method as recited in claim 1, wherein the gas turbine engine is operated under varying operating conditions which influence engine vibration response.

3. The method as recited in claim 2, wherein said varying operating conditions comprise one or more of the following: power setting, flight regime, altitude and temperature.

4. The method as recited in claim 2, further comprising:
   (h) pre-storing a set of influence coefficients that are characteristic of a model of the engine being balanced; and
   (i) deriving influence coefficients from said set of influence coefficients,
   wherein step (d) comprises vector multiplication of respective vibration data points times derived influence coefficients.

5. The method as recited in claim 4, wherein said influence coefficients are a function of at least a speed of a shaft of the engine at the time when the respective vibration data point was acquired.

6. The method as recited in claim 1, wherein circumferential locations of said balancing masses are equidistant from a centerline of a shaft of the gas turbine engine.

7. The method as recited in claim 1, wherein operation (b) comprises:
   acquiring vibration sensor data from the vibration sensor under different operating conditions while the airplane is flying at speeds within a first speed range; and
   acquiring vibration sensor data from the vibration sensor under different operating conditions while the airplane is flying at speeds within a second speed range which is different than said first speed range.

\* \* \* \* \*